(12) United States Patent
Fujiwara et al.

(10) Patent No.: US 10,627,265 B2
(45) Date of Patent: Apr. 21, 2020

(54) SENSOR ASSIGNMENT APPARATUS AND SENSOR DIAGNOSTIC APPARATUS

(71) Applicant: KABUSHIKI KAISHA TOSHIBA, Minato-ku (JP)

(72) Inventors: Kenichi Fujiwara, Kawasaki (JP); Hideyuki Aisu, Kawasaki (JP); Hisaaki Hatano, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 362 days.

(21) Appl. No.: 14/660,017

(22) Filed: Mar. 17, 2015

(65) Prior Publication Data
US 2015/0268072 A1 Sep. 24, 2015

(30) Foreign Application Priority Data
Mar. 19, 2014 (JP) .................... 2014-057002

(51) Int. Cl.
*G01D 21/02* (2006.01)
*G01D 1/16* (2006.01)

(52) U.S. Cl.
CPC ............. *G01D 21/02* (2013.01); *G01D 1/16* (2013.01)

(58) Field of Classification Search
USPC ...................................................... 702/183
See application file for complete search history.

(56) References Cited

U.S. PATENT DOCUMENTS

| | | | | |
|---|---|---|---|---|
| 5,511,037 A | * | 4/1996 | Randall | E21B 47/00 367/33 |
| 6,751,553 B2 | * | 6/2004 | Young | G01V 1/00 342/22 |
| 8,577,649 B2 | | 11/2013 | Suyama et al. | |
| 2006/0026187 A1 | * | 2/2006 | Hatano | G06F 17/30705 |
| 2012/0041575 A1 | * | 2/2012 | Maeda | G05B 23/024 700/80 |
| 2013/0024172 A1 | * | 1/2013 | Suyama | G05B 23/0232 703/2 |
| 2015/0035662 A1 | * | 2/2015 | Bowers | B60Q 9/008 340/436 |

FOREIGN PATENT DOCUMENTS

| | | |
|---|---|---|
| JP | 9-212077 A | 8/1997 |
| JP | 2000-339357 A | 12/2000 |
| JP | 2006-135412 A | 5/2006 |
| JP | 2008-269215 A | 11/2008 |
| JP | 2010-190582 A | 9/2010 |
| JP | 2013-73414 A | 4/2013 |
| WO | WO 2011/121726 A1 | 10/2011 |

* cited by examiner

*Primary Examiner* — Roy Y Yi
(74) *Attorney, Agent, or Firm* — Oblon, McClelland, Maier & Neustadt, L.L.P.

(57) ABSTRACT

In one embodiment, a sensor assignment apparatus includes a measured value storage, a generator, a calculator, and a selector. The measured value storage stores measured values of a plurality of sensors. The generator generates combinations of sensors and arguments of a function to diagnose sensors by assigning sensors to its arguments. The calculator calculates evaluation values which are based on the function values. The function values are obtained by applying diagnostic functions to measured values for all combinations generated by the generator. The selector selects at least one combination from the resulting set of the generator by considering the evaluation values of combinations calculated by the calculator.

15 Claims, 15 Drawing Sheets

| ID | DESCRIPTION | MEASUREMENT ATTRIBUTE | TYPE ATTRIBUTE | LOCATION ATTRIBUTE | |
|---|---|---|---|---|---|
| | | UNIT | MEASURED/CONTROL | from | to |
| T1 | HEAT EXCHANGER 01 AMBIENT AIR INLET TEMPERATURE | °C | MEASURED | AMBIENT AIR NODE | HEAT EXCHANGER 01/ HEAT EXCHANGE NODE 02 |
| T2 | HEAT EXCHANGER 01 CHARGE AIR TEMPERATURE | °C | MEASURED | HEAT EXCHANGER 01/FAN 03 | ROOM NODE |
| Q1 | HEAT EXCHANGER 01 INSTANTANEOUS AMOUNT OF HEAT | kJ/s | MEASURED | HEAT EXCHANGER 01/ HEAT EXCHANGE NODE 02 | HEAT EXCHANGER 01/ HEAT EXCHANGE NODE 02 |
| V1 | HEAT EXCHANGER 01 INSTANTANEOUS AIR VOLUME | m3/s | MEASURED | HEAT EXCHANGER 01/FAN 03 | ROOM NODE |
| Hz1 | HEAT EXCHANGER 01 FAN FREQUENCY | Hz | CONTROL | HEAT EXCHANGER 01/FAN 03 | HEAT EXCHANGER 01/FAN 03 |
| ⋮ | ⋮ | ⋮ | ⋮ | ⋮ | ⋮ |

FIG. 3

| MODEL ID | MODEL FORMULA | ARGUMENT | MEASUREMENT ATTRIBUTE | TYPE ATTRIBUTE | LOCATION ATTRIBUTE | |
|---|---|---|---|---|---|---|
| | | | UNIT | MEASURED/ CONTROL | from | to |
| F0010 | β1X1 * (X2−X3)−X4+β2 | X1 | m3/s | MEASURED | HEAT EXCHANGER | HEAT EXCHANGER |
| | | X2 | °C | MEASURED | HEAT EXCHANGER | |
| | | X3 | °C | MEASURED | | HEAT EXCHANGER |
| | | X4 | kJ/s | MEASURED | HEAT EXCHANGER | HEAT EXCHANGER |
| F0011 | β1X1 * (X2−X3)−X4+β2 | X1 | Hz | MEASURED | HEAT EXCHANGER | HEAT EXCHANGER |
| | | X2 | °C | MEASURED | HEAT EXCHANGER | |
| | | X3 | °C | MEASURED | | HEAT EXCHANGER |
| | | X4 | kJ/s | MEASURED | HEAT EXCHANGER | HEAT EXCHANGER |
| ⋮ | | | ⋮ | ⋮ | ⋮ | |

FIG. 4

| MEASUREMENT DATA AND TIME | T1 | T2 | Q1 | V1 | Hz1 | ... |
|---|---|---|---|---|---|---|
| 2013/9/13 8:00 | | 25 | 24 | -6.6 | 5.5 | 1100 |
| 2013/9/13 8:10 | | 25 | 22 | -6.8 | 1.9 | 380 |
| 2013/9/13 8:20 | | 25 | 22 | -5.4 | 1.5 | 300 |
| 2013/9/13 8:30 | | 26 | 22 | -7.2 | 1.5 | 300 |
| 2013/9/13 8:40 | | 26 | 22 | -10.6 | 2.2 | 440 |
| ... | | ... | ... | ... | ... | ... |

FIG. 5

| COMBINATION ID | MODEL ID | X1 | X2 | X3 | X4 | X5 | ... |
|---|---|---|---|---|---|---|---|
| C001 | F0010 | T1 | T2 | Q1 | V1 | null | ... |
| C002 | F0010 | T1 | T2 | Q1 | Hz1 | null | ... |
| ... | ... | ... | ... | ... | ... | ... | ... |
| C101 | F0010 | V1 | T2 | T1 | Hz1 | null | ... |
| C102 | F0010 | T2 | V1 | T1 | Q1 | null | ... |
| C103 | F0010 | V1 | T2 | T1 | Q1 | null | ... |
| ... | ... | ... | ... | ... | ... | ... | ... |

FIG. 6

| COMBINATION ID | MODEL ID | X1 | X2 | X3 | X4 | X5 | ... |
|---|---|---|---|---|---|---|---|
| C103 | F0010 | V1 | T2 | T1 | Q1 | null | ... |
| ... | ... | ... | ... | ... | ... | ... | ... |

| ID | DESCRIPTION | MEASUREMENT ATTRIBUTE UNIT | TYPE ATTRIBUTE MEASURED/CONTROL | LOCATION ATTRIBUTE from | to |
|---|---|---|---|---|---|
| T1 | HEAT EXCHANGER 01 AMBIENT AIR INLET TEMPERATURE | °C | MEASURED | AMBIENT AIR NODE | HEAT EXCHANGER 01/HEAT EXCHANGE NODE 02 |
| T2 | HEAT EXCHANGER 01 CHARGE AIR TEMPERATURE | °C | MEASURED | HEAT EXCHANGER 01/FAN 03 | ROOM NODE |
| Q1 | HEAT EXCHANGER 01 INSTANTANEOUS AMOUNT OF HEAT | kJ/s | MEASURED | HEAT EXCHANGER 01/HEAT EXCHANGE NODE 02 | HEAT EXCHANGER 01/HEAT EXCHANGE NODE 02 |
| V1 | HEAT EXCHANGER 01 INSTANTANEOUS AIR VOLUME | m3/s | MEASURED | HEAT EXCHANGER 01/FAN 03 | ROOM NODE |
| Hz1 | HEAT EXCHANGER 01 FAN FREQUENCY | Hz | CONTROL | HEAT EXCHANGER 01/FAN 03 | HEAT EXCHANGER 01/FAN 03 |
| T3 | ROOM 04 EXHAUST | °C | MEASURED | BRANCH NODE | EXHAUST NODE |
| ... | | | | | |

FIG. 14B

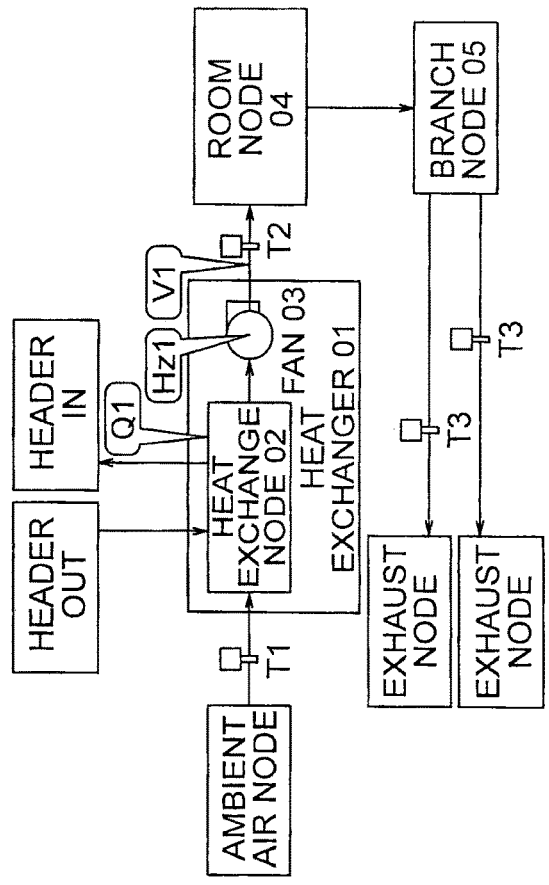

SENSOR ASSIGNMENT APPARATUS AND SENSOR DIAGNOSTIC APPARATUS

CROSS REFERENCE TO RELATED APPLICATION(S)

This application is based upon and claims the benefit of priority from the prior Japanese Patent Application No. 2014-057002, filed on Mar. 19, 2014, the entire contents of which are incorporated herein by reference.

FIELD

Embodiments described herein relate generally to a sensor assignment apparatus and a sensor diagnostic apparatus.

BACKGROUND

In recent years, attention has been focused on automatic diagnosis where abnormalities in equipment are automatically diagnosed based on data which is periodically obtained from sensors and actuators (hereinafter, collectively referred to as "sensors") in inspection of the equipment in a large-scale facility such as a high-rise building. The process of assigning sensors on an instrumentation diagram to a diagnostic model, i.e., assigning sensor IDs to the arguments of a diagnostic model, to implement automatic diagnosis is called "object mapping".

Conventionally, to facilitate object mapping, there is proposed a method of supporting the creation and management of an instrumentation diagram by recording connection information (a list of sensor IDs and cable numbers) in conjunction with instrumentation company's work. Based on an instrumentation diagram created by the method, assignment of sensors to a diagnostic model can be performed.

However, in the above-described conventional method, although an instrumentation diagram can be created, a method of assigning sensors to a diagnostic model is unknown. Therefore, to perform object mapping, an appropriate combination needs to be searched for from among combinations of sensors on an instrumentation diagram and a diagnostic model. This is problematic when there are an enormous number of sensors placed or when the locations where sensors are placed extend over a plurality of instrumentation diagrams.

BRIEF DESCRIPTION OF THE DRAWINGS

FIG. 3 is a diagram showing an example of sensor information stored in a sensor information storage;

FIG. 4 is a diagram showing an example of diagnostic models stored in a diagnostic model storage;

FIG. 5 is a diagram showing an example of measured values stored in a normal measured value storage;

FIG. 6 is a diagram showing an example of combinations generated by a combination generator;

FIG. 7 is a diagram showing an example of a combination stored in an assignment result storage;

FIGS. 14A and 14B are diagrams showing sensor information and an instrumentation diagram for when a location attribute is ambiguous.

DETAILED DESCRIPTION

Embodiments will now be explained with reference to the accompanying drawings. The present invention is not limited to the embodiments.

In one embodiment, a sensor assignment apparatus includes a measured value storage, a generator, a calculator, and a selector. The measured value storage stores measured values of a plurality of sensors. The generator assigns the sensors to a respective plurality of arguments of a diagnostic function for the sensors. The generator generates combinations of sensors and arguments of a function to diagnose sensors by assigning sensors to its arguments. The calculator calculates evaluation values which are based on the function values. The function values are obtained by applying diagnostic functions to measured values for all combinations generated by the generator. The selector selects at least one combination from the resulting set of the generator by considering the evaluation values of combinations calculated by the calculator.

A sensor assignment apparatus and a sensor diagnostic apparatus which will be described below can be used for automatic sensor diagnosis in a facility provided with a plurality of sensors, based on the measured values and control values (hereinafter, collectively referred to as "measured values") of the sensors. In addition, the sensor assignment apparatus and the sensor diagnostic apparatus can also be used for automatic diagnosis of equipment related to the measured values of the sensors, based on sensor diagnostic results. Specifically, the sensor assignment apparatus and the sensor diagnostic apparatus can be used, for example, for automatic diagnosis of air conditioning equipment provided in buildings, factories, etc., or automatic diagnosis of water and sewer equipment.

First Embodiment

Figure 1:
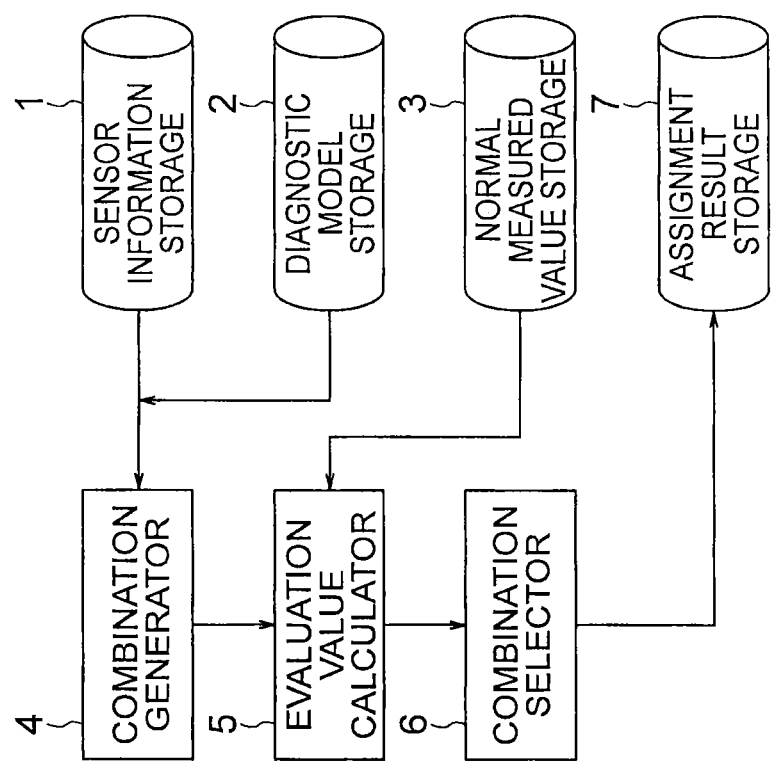
FIG. 1 is a block diagram showing a functional configuration of a sensor assignment apparatus according to a first embodiment.

First, a configuration of a sensor assignment apparatus according to a first embodiment will be described with reference to FIGS. 1 to 8. FIG. 1 is a block diagram showing a functional configuration of a sensor assignment apparatus according to the present embodiment. The sensor assignment apparatus of FIG. 1 includes a sensor information storage 1, a diagnostic model storage 2, a normal measured value storage 3, a combination generator 4, an evaluation value calculator 5, a combination selector 6, and an assignment result storage 7.

The sensor information storage 1 stores sensor information about a plurality of sensors provided in a facility, and inputs the stored sensor information to the combination generator 4 which will be described later. Each of sensor information includes, for example, a sensor ID of the sensor, a description of the sensor, and attribute information. The sensor ID is identification information for identifying the sensor. The attribute information is information indicating the characteristics of the sensor identified by the sensor ID and includes, for example, a measurement attribute, a location attribute, and a type attribute. The measurement attribute indicates the unit of a measured value measured by the sensor. The location attribute indicates a location where the sensor is placed. The type attribute is information indicating whether the physical quantity to be stored is an actual measured value of the sensor or a control value obtained from control information. The attribute information is not limited to the above-described information as long as the attribute information is information indicating the characteristics of the sensor.

Figure 2:
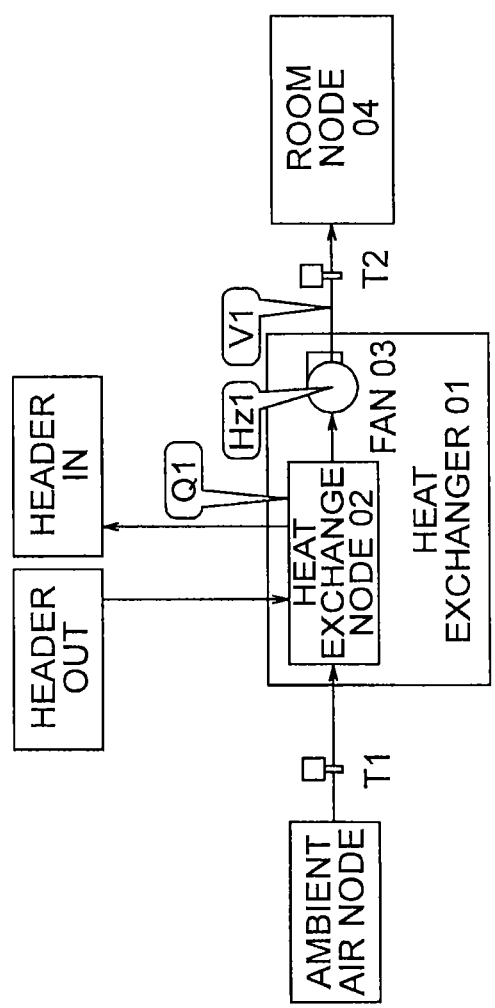
FIG. 2 is an instrumentation diagram showing an example of air conditioning equipment to which the sensor assignment apparatus according to the first embodiment is applied.

FIG. 2 is an instrumentation diagram showing an example of air conditioning equipment to which the sensor assignment apparatus according to the present embodiment is applied. FIG. 3 is a diagram showing an example of sensor information which is stored in the sensor information storage 1 in association with the instrumentation diagram of FIG. 2.

FIG. 2 is a directed graph, and directed edges (arrows in FIG. 2) indicate piping and directions in which air or water flows in the air conditioning equipment. Nodes at both ends of each directed edge indicate portions where the state of air or water changes, such as devices, branch points, and rooms, and are assigned instrumentation node IDs. In addition, in FIG. 2, sensors are provided on the directed edges and the nodes and assigned sensor IDs. In the following, a sensor with sensor ID "X" is simply referred to as the sensor X.

FIG. 3 shows an example of sensor information which is stored in the sensor information storage 1 for the air conditioning equipment shown in FIG. 2. In FIG. 3, each of sensor information includes a sensor ID, a description of a sensor, a measurement attribute, a type attribute, and a location attribute. A location attribute indicates the position of a sensor represented by a pair of nodes, one of which the sensor target (air or water) goes from and the other of which it goes to. For example, in FIG. 2, the location attribute of a sensor T1 provided on a directed edge between an ambient air node and a heat exchange node 02 has the ambient air node as a start point (from) and the heat exchange node 02 as an end point (to).

The diagnostic model storage 2 stores at least one diagnostic model for diagnosing abnormalities in sensors or equipment, and inputs the stored diagnostic model to the combination generator 4 which will be described later. The diagnostic model includes, for example, a model ID, a model formula, arguments, and attribute information of the stored diagnostic model. The model ID is identification information for identifying a diagnostic model when a plurality of diagnostic models are stored in the diagnostic model storage 2.

The model formula is a diagnostic function which is predetermined to diagnose the sensors and the equipment. In the model formula, it is not determined which measured value used for computation is of which sensor, and a sensor using a measured value is an argument. The model formula has a plurality of arguments and each argument is assigned a sensor. When the argument is represented as $x_i$ ($i=1, 2, \ldots$) and the model formula as $f(x_i)$, the model formula $f(x_i)$ is a function of the measured values of sensors assigned to the respective arguments $x_i$. As described above, the arguments are stored in the diagnostic model storage 2.

The attribute information is information indicating the characteristics of the sensor as with the attribute information stored in the sensor information storage 1, and is stored for each argument. The attribute information stored in the diagnostic model storage 2 is attribute information requested by a sensor assigned to the argument $X_i$.

FIG. 4 is a diagram showing an example of diagnostic models stored in the diagnostic model storage 2. FIG. 4 shows two diagnostic models, and a model ID, a model formula, arguments, and attribute information are stored for each diagnostic model. For example, the model formula $f(X|\beta)$ of the diagnostic model F0010 is $\beta 1 \times X1 \times (X2-X3) - X4 + \beta 2$. It is assumed that the model formula $f(X|\beta)$ satisfies $f(X|\beta)=0$ when the sensors assigned to the arguments $X_i$ are normal. $\beta i$ ($i=1$ and $2$) in the formula is an amount of adjustment (parameter) which is simultaneously determined when calculating an evaluation value (described later) after assigning sensors to the arguments $X_i$ ($i=1$ to $4$).

The normal measured value storage 3 stores measured values which are reference measured values measured beforehand (past) and which are considered normal, and inputs the stored measured values to the evaluation value calculator 5 which will be described later. For the measured values considered normal, for example, measured values which are measured when a plurality of sensors serving as diagnostic targets are operating in a normal state can be used. The evaluation value calculator 5 diagnoses whether there are abnormalities in the sensors, based on the measured values.

FIG. 5 is a diagram showing an example of measured values stored in the normal measured value storage 3. In FIG. 5, the measured values of sensors measured at each date and time are stored at 10-minute intervals. As such, it is preferred that the normal measured value storage 3 store, at a predetermined time interval, a plurality of sets of measured values of sensors whose measurement timings are synchronized with each other. This is because even if the sensors are in a normal state, the measured values of the sensors change over time, and thus, if the sensing timings are not synchronized with each other, then whether there are abnormalities in the sensors cannot be diagnosed.

Note that the normal measured value storage 3 may be a storage unit that stores the measured values of the sensors. In this case, the normal measured value storage 3 inputs to the evaluation value calculator 5 measured values with dates and times at which the sensors are found to have operated in a normal state among the stored measured values of the sensors.

The combination generator 4 obtains sensor information from the sensor information storage 1, obtains a diagnostic model from the diagnostic model storage 2, and assigns sensors (sensor IDs) to the respective arguments of a model formula of the diagnostic model. By this, a combination of the diagnostic model and the sensors assigned to the diagnostic model is generated. The combination generator 4 generates a plurality of such combinations. The combination generator 4 inputs the plurality of generated combinations to the evaluation value calculator 5.

The combination generator 4, for example, randomly assigns sensors to the arguments of a diagnostic model, and thereby exhaustively generates combinations. In this case, for N arguments and M sensors, M!/(N−M)! combinations are generated.

In addition, the combination generator 4 can also generate a combination of a diagnostic model and sensors by assigning sensors to arguments, according to the attribute information of the arguments and the attribute information of the sensors. Specifically, the combination generator 4 refers to the attribute information of arguments and assigns sensors to the arguments of a diagnostic function when the attribute information of each sensor matches that of each argument. By this, the number of combinations to be generated is reduced, enabling to reduce the time required for assignment of the sensors.

FIG. 6 is a diagram showing an example of combinations of a diagnostic model and sensors generated by the combination generator 4. The combinations of FIG. 6 are generated based on the sensor information of FIG. 3 and the diagnostic models of FIG. 4. As shown in FIG. 6, each combination is assigned a combination ID. For example, in a combination C001, for the arguments $X_i (i=1$ to $4)$ of a diagnostic model F0010, a sensor T1 is assigned to an argument X1, a sensor T2 to an argument X2, a sensor Q1 to an argument X3, and a sensor V1 to an argument X4. Since the diagnostic model F0010 does not include an argument X5, the "argument X5" field is null (no value).

When the combination generator 4 exhaustively generates combinations, all combinations shown in FIG. 6 are generated. On the other hand, when the combination generator 4 generates combinations such that the location attribute of an argument matches the location attribute of a sensor, of the combinations shown in FIG. 6 combinations C101 to C103 are generated. When the combination generator 4 generates combinations such that the measurement attribute and location attribute of an argument match the measurement attribute and location attribute of a sensor, of the combinations shown in FIG. 6 a combination C103 is generated. As such, the combination generator 4 may use one piece of attribute information or use a plurality of pieces of attribute information to generate combinations.

The evaluation value calculator 5 obtains the plurality of combinations generated by the combination generator 4 and obtains the measured values of the sensors from the normal measured value storage 3 to calculate evaluation values of the combinations. The evaluation value is a numerical value indicating the degree of suitability of a generated combination for sensor diagnosis. The evaluation value is calculated based on a diagnostic function value (hereinafter, referred to as a "model value") obtained by applying diagnostic functions to measured values of sensors assigned in each combination into a model formula included in a diagnostic model forming the combination. For the measured values of the sensors substituted into the model formula, as described above, it is preferred that the sensing timings be synchronized with each other. In addition, to accurately select a combination of a diagnostic model and sensors suitable for sensor diagnosis, it is preferred that model values are calculated from normal value samples.

The evaluation value changes according to the property of a model formula. For example, in the case of a model formula where it is assumed that a model value becomes a predetermined value when the measured values of normal sensors are substituted, like the model formula $f(X|\beta)$ of FIG. 4, the evaluation value calculator 5 uses the model value as an evaluation value. This is because the model value being the predetermined value or being close to the predetermined value indicates that the combination is suitable for sensor diagnosis. In addition, in the case of such a model formula, the degree of distribution (the variation, the standard deviation, etc.) between a plurality of model values can also be used as an evaluation value.

Alternatively, in the case of a model formula where it is assumed that a model value shows some kind of correlation with the measured values when the measured values of normal sensors are substituted, the evaluation value calculator 5 can calculate an evaluation value by regression analysis. For example, a regression formula where the model value is the objective variable and the parameter correlated with the model value is the explanatory variable is calculated and the sum of least square errors between the regression formula and a plurality of model values can be used as an evaluation value. In this case, a smaller sum of least square errors indicates a more suitable combination for sensor diagnosis. In addition, a correlation coefficient between a model value and measured values can also be used as an evaluation value. In this case, a higher correlation coefficient indicates a more suitable combination for sensor diagnosis. The parameter includes, for example, the measured value of a sensor and ambient temperature.

The evaluation value calculator 5 inputs the plurality of combinations inputted from the combination generator 4 and the calculated evaluation values of the combinations to the combination selector 6. In addition, when an amount of adjustment such as β in the model formula $f(X|\beta)$ is calculated in the course of calculating an evaluation value, the amount of adjustment may be inputted to the combination selector 6.

The combination selector 6 selects at least one combination suitable for sensor diagnosis from among the plurality of combinations inputted from the evaluation value calculator 5, by considering the evaluation values of combinations. The combination selector 6 may select one combination most suitable for sensor diagnosis by referring to the evaluation values of the combinations or may select one or more combinations whose evaluation values fall within a predetermined range. The combination selector 6 inputs the selected combination to the assignment result storage 7.

The assignment result storage 7 stores the combination of a diagnostic model and sensors selected by the combination selector 6. Since the combination stored in the assignment result storage 7 is a combination suitable for sensor diagnosis, by substituting the measured values of the assigned sensors into the model formula and comparing an obtained model value with an assumed model value, abnormalities in the assigned sensors can be diagnosed.

FIG. 7 is a diagram showing an example of a combination stored in the assignment result storage 7. When abnormalities in sensors are diagnosed using the combination shown in FIG. 7, the measured values of sensors V1, T2, T1, and Q1 are substituted for the arguments $X_i (i=1$ to $4)$ of the model formula of the diagnostic model F0010, and an obtained model value is compared with an assumed model value (=0), by which abnormalities in the sensors V1, T2, T1, and Q1 can be diagnosed. Note that the assignment result storage 7 may store evaluation values or amounts of adjustment to diagnose sensors.

Figure 8:
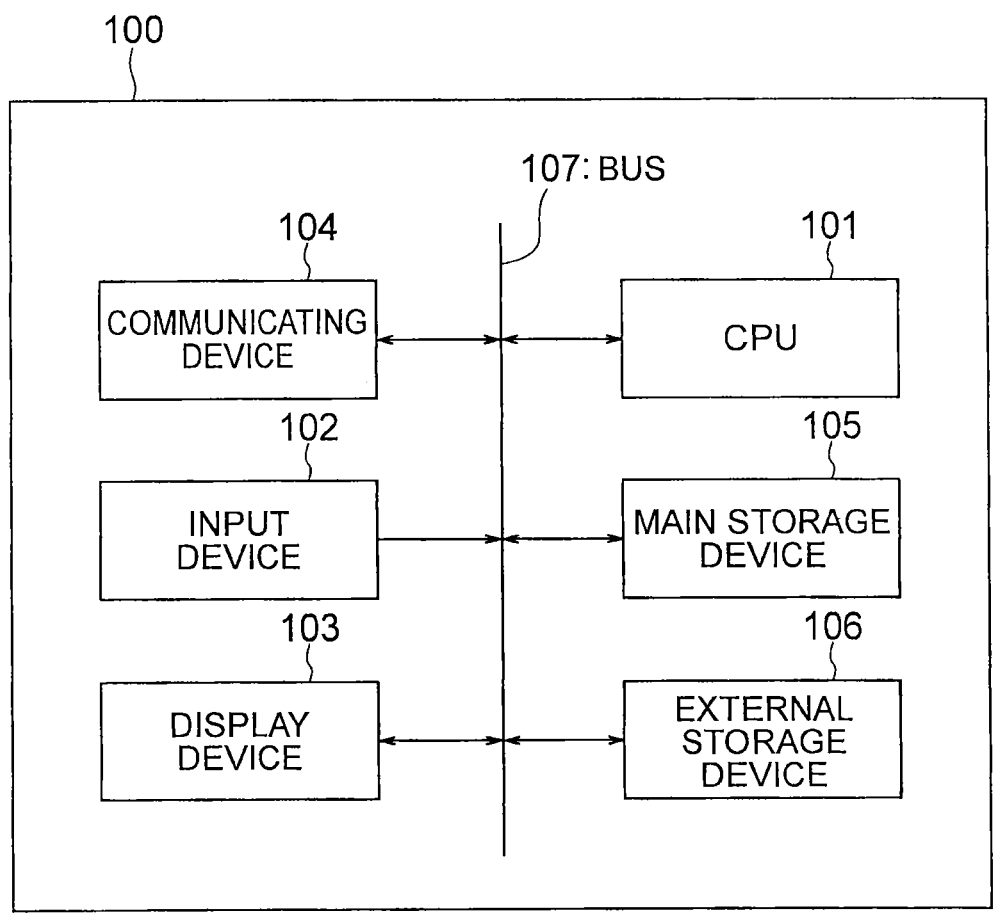
FIG. 8 is a block diagram showing a physical configuration of the sensor assignment apparatus according to the first embodiment.

The sensor assignment apparatus described above can be implemented by using a computer apparatus 100 as basic hardware. As shown in FIG. 8, the computer apparatus 100 includes a CPU 101, an input device 102, a display device 103, a communicating devicet 104, a main storage device 105, and an external storage device 106, and they are communicably connected to each other by a bus 107.

The input device 102 includes input devices such as a keyboard and a mouse, and outputs to the CPU 101 operation signals generated by operations of the input devices. The display device 103 includes a display such as an LCD (Liquid Crystal Display) or a CRT (Cathode Ray Tube). The communicating devicet 104 has a wireless or wired communication means and performs communication by a predetermined communication scheme. The external storage device 106 includes, for example, a storage medium such as a hard disk, a memory apparatus, a CD-R, a CD-RW, a DVD-RAM, or a DVD-R. The external storage device 106 stores a control program for allowing the CPU 101 to perform the processes of the sensor assignment apparatus. In addition, the external storage device 106 stores data in each storage means included in the sensor assignment apparatus.

The main storage device 105 expands the control program stored in the external storage device 106 under the control of the CPU 101 and stores data required when executing the program, data generated by the execution of the program, etc. By the CPU 101 executing the control program, the functional configurations of the combination generator 4, the evaluation value calculator 5, and the combination selector 6 are implemented. The main storage device 105 includes, for example, any memory such as nonvolatile memory. The sensor information storage 1, the diagnostic model storage 2, the normal measured value storage 3, and the assignment result storage 7 are configured by the main storage device 105 or the external storage device 106.

The control program may be pre-installed on the computer apparatus 100 or may be stored in a storage medium such as a CD-ROM and then installed on the computer apparatus 100 as appropriate.

Figure 9:
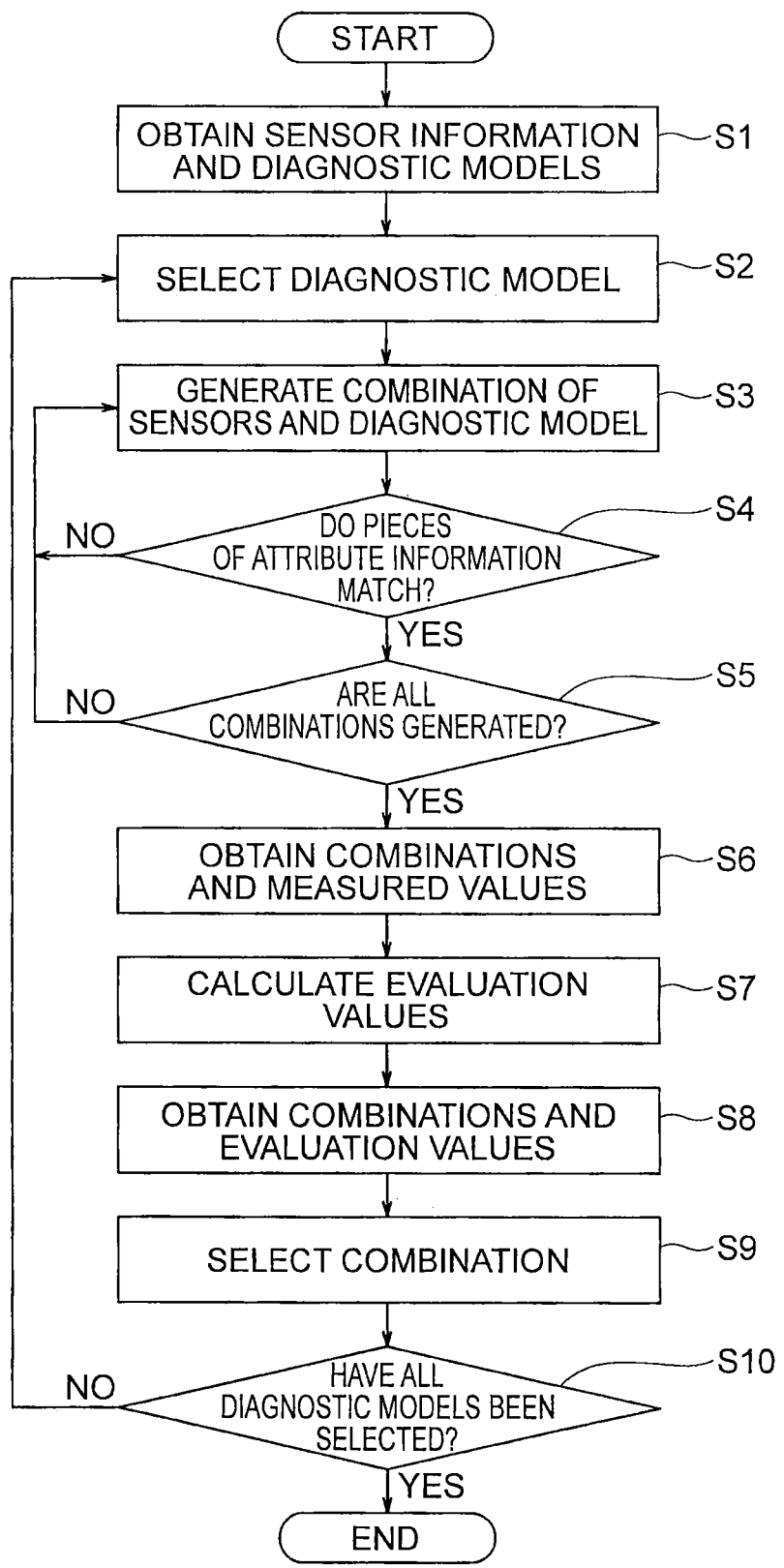
FIG. 9 is a flowchart showing a sensor assignment process performed by the sensor assignment apparatus according to the first embodiment.

Next, a sensor assignment process performed by the sensor assignment apparatus according to the present embodiment will be described with reference to FIG. 9. FIG. 9 is a flowchart showing the operation of the sensor assignment apparatus according to the present embodiment.

A sensor assignment process performed by the sensor assignment apparatus according to the present embodiment is performed, for example, periodically on a predetermined period basis or when additions or changes have been made to equipment by renovation. When an assignment process starts, first, the combination generator 4 obtains sensor information (see FIG. 3) from the sensor information storage 1 and obtains diagnostic models (see FIG. 4) from the diagnostic model storage 2 (step S1).

Then, the combination generator 4 selects a diagnostic model to be subjected to an assignment process from among the obtained diagnostic models (step S2). The combination generator 4 assigns sensors to arguments included in the selected diagnostic model and thereby generates a combination of the sensors and the diagnostic model (step S3). At this time, the combination generator 4 exhaustively assigns the sensors to the arguments. By this, for example, a combination C001 shown in FIG. 6 is generated.

Then, the combination generator 4 determines whether the attribute information of each sensor and the attribute information of each argument which are combined together match each other (step S4). If the pieces of attribute information match each other (YES at step S4), the combination generator 4 temporarily stores the generated combination and determines whether all combinations are generated (step S5). If all combinations are not generated (NO at step S5), the combination generator 4 generates a next combination. It is preferred that the sensor assignment apparatus include a temporary storage unit that temporarily stores generated combinations.

If the pieces of attribute information do not match each other (NO at step S4), the combination generator 4 abandons the generated combination and generates a next combination (step S3). Attribute information used for the determination at step S4 can be arbitrarily selected. For example, when the determination is performed using a measurement attribute, the measurement attribute of the argument X1 and the measurement attribute of the sensor T1 of the combination C001 are compared with each other. Since the measurement attribute of X1 is $m^3/s$ (see FIG. 4) and the measurement attribute of the sensor T1 is ° C. (see FIG. 3), the pieces of attribute information do not match each other. Therefore, the combination generator 4 abandons the combination C001 and generates a next combination. As the next combination, for example, a combination C002 is generated.

By repeating the above-described steps S3 to S5, all combinations where pieces of attribute information match each other are generated for the selected diagnostic model (YES at step S5). Note that when the combination generator 4 exhaustively generates combinations without using attribute information, the above-described step S4 may be omitted.

When all combinations are generated, the combination generator 4 inputs the temporarily stored combinations to the evaluation value calculator 5. The evaluation value calculator 5 obtains the combinations inputted from the combination generator 4 and obtains the measured values of the sensors from the normal measured value storage 3 (step S6).

The evaluation value calculator 5 calculates evaluation values of the respective obtained combinations, based on the obtained measured values (step S7). An evaluation value to be calculated can be arbitrarily selected according to a model formula included in a diagnostic model. For example, the evaluation value calculator 5 calculates, for each combination, a model value by substituting measured values whose measurement dates and times are "2013/9/13 8:00" into the model formula and thereafter calculates a model value for each of the measured values whose measurement dates and times are at 10-minute intervals. From the thus calculated plurality of model values, the sum of least square errors and a regression coefficient are calculated by regression analysis, and the sum of least square errors is temporarily stored as an evaluation value and the regression coefficient as an amount of adjustment β of the model formula. It is preferred that the sensor assignment apparatus include a temporary storage unit that temporarily stores the calculated evaluation values and amounts of adjustment (hereinafter, referred to as "evaluation values, etc."). The evaluation value calculator 5 inputs the calculated evaluation values, etc., and combinations for the evaluation values, etc., to the combination selector 6.

When the combination selector 6 obtains the evaluation values, etc., and the combinations from the evaluation value calculator 5 (step S8), the combination selector 6 selects a combination suitable for sensor diagnosis from among the obtained combinations, based on the evaluation values (step S9). For example, when the sum of least square errors is obtained as an evaluation value, the combination selector 6 selects a combination with a small evaluation value. The combination selector 6 may select one combination most suitable for sensor diagnosis or may select two or more combinations suitable for sensor diagnosis.

The combination selector 6 allows the assignment result storage 7 to store the selected combination and determines whether all diagnostic models have been selected (step S10). Specifically, the combination selector 6 determines whether combinations have been selected by performing the processes at steps S3 to S9 for all of the diagnostic models obtained by the combination generator 4. If combinations have been selected for all of the diagnostic models (YES at step S10), the assignment process ends. On the other hand, when, as shown in FIG. 4, there are a plurality of diagnostic models and there is an unprocessed diagnostic model (NO at step S10), the assignment process returns to step S2 and the combination generator 4 selects a next diagnostic model and the processes at steps S3 to S9 are performed again. In this manner, combinations are selected for all of the diagnostic models.

As described above, according to the sensor assignment apparatus according to the present embodiment, since appropriate sensors can be automatically assigned to a diagnostic model, sensors can be easily assigned without the need of expert knowledge about diagnostic models or diagnostic apparatuses. At the same time, a parameter such as an amount of adjustment required for diagnosis can also be automatically determined for each diagnostic model.

In addition, since assignment of sensors can be automatically performed, even when additions or changes have been made to equipment by renovation, etc., assignment of new sensors can be promptly determined, enabling to perform sensor diagnosis.

Furthermore, by generating a combination of a diagnostic model and sensors using the attribute information of the sensors and the attribute information of arguments, combinatorial explosion is suppressed, enabling to reduce the capacity of a storage apparatus and reduce the time required for an assignment process.

Note that although in the assignment process of FIG. 9 generation of combinations and calculation of evaluation values are implemented by a waterfall scheme where each process is performed collectively, the configuration is not limited thereto. For example, it is also possible to employ a process in which an evaluation value is calculated every time one combination is generated. In addition, it is also possible to perform the process of searching for an appropriate combination using any algorithm such as a genetic algorithm. By this, even when there are a large number of sensors, appropriate assignment can be selected in a short time.

Second Embodiment

Figure 10:
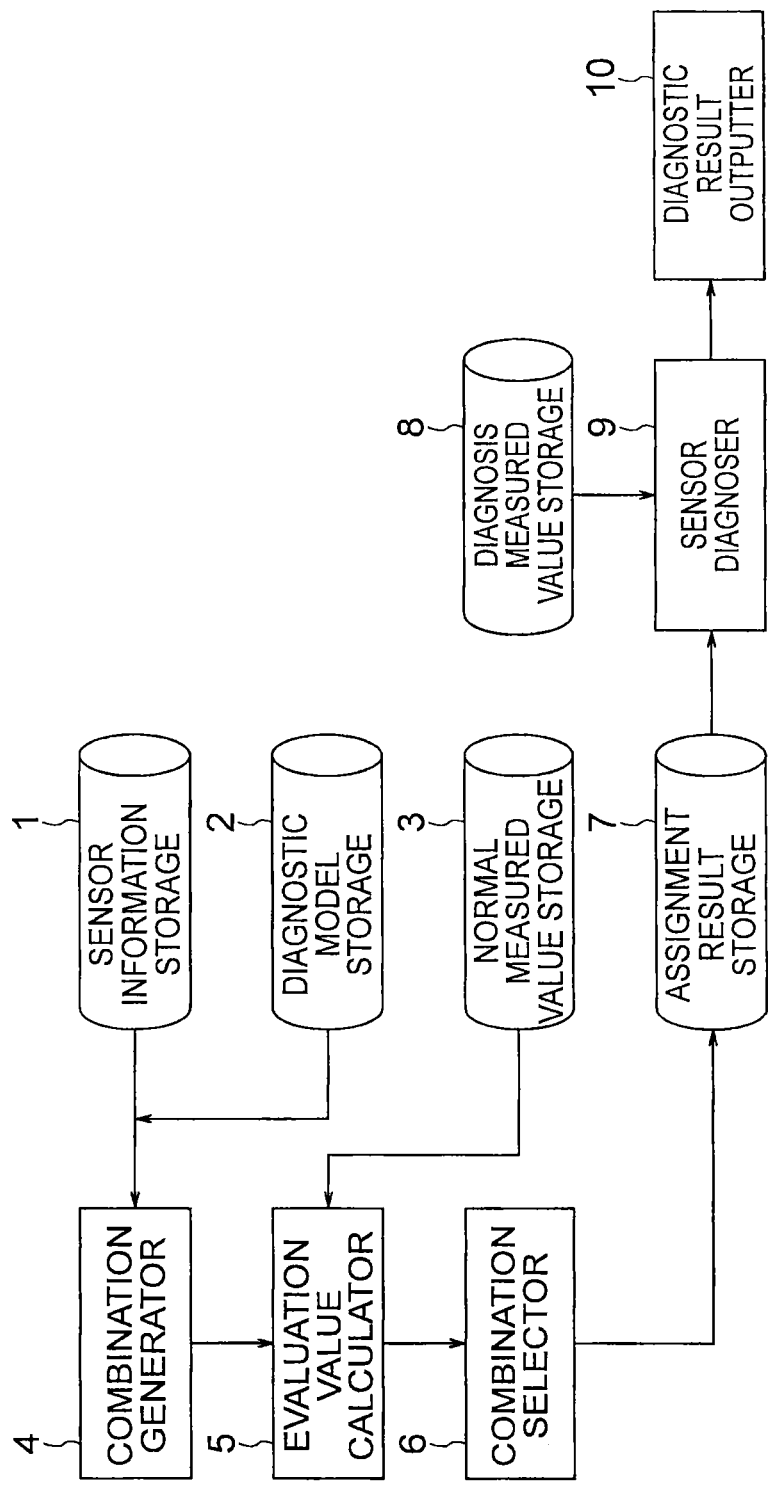
FIG. 10 is a block diagram showing a functional configuration of a sensor diagnostic apparatus according to a second embodiment.
Figure 11:
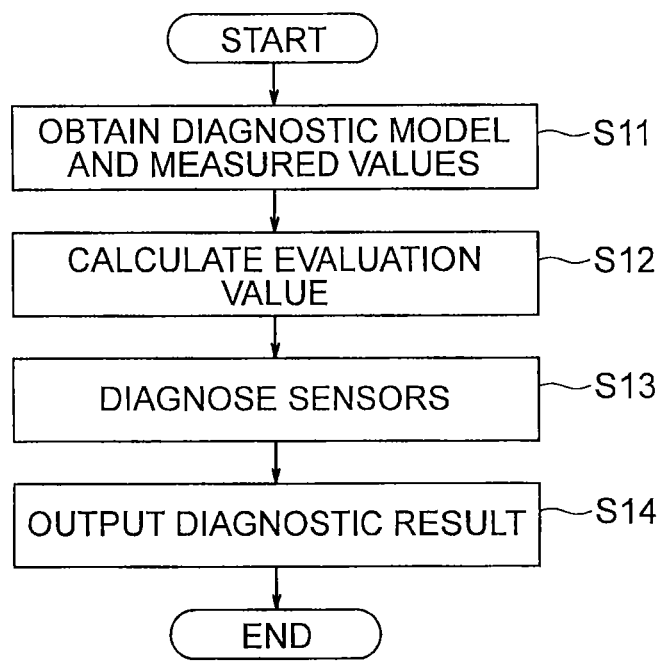
FIG. 11 is a flowchart showing a sensor diagnostic process performed by the sensor diagnostic apparatus according to the second embodiment.

Next, as a second embodiment, a sensor diagnostic apparatus including a sensor assignment apparatus according to the first embodiment will be described with reference to FIGS. 10 and 11. FIG. 10 is a block diagram showing a functional configuration of a sensor diagnostic apparatus according to the present embodiment. The sensor diagnostic apparatus of FIG. 10 includes a sensor assignment apparatus according to the first embodiment, a diagnosis measured value storage 8, a sensor diagnoser 9, and a diagnostic result outputter 10.

The diagnosis measured value storage 8 stores the measured values of sensors as diagnostic targets. The measured values stored in the diagnosis measured value storage 8 are stored in the same format as measured values stored in the normal measured value storage 3 (see FIG. 5). However, unlike the measured values stored in the normal measured value storage 3, the measured values stored in the diagnosis measured value storage 8 are not limited to measured values obtained when sensors are operating normally. The diagnosis measured value storage 8 is configured by a main storage device 105 or an external storage device 106. Note that one storage unit may be shared by the normal measured value storage 3 and the diagnosis measured value storage 8. In this case, of the measured values of sensors stored in the storage unit, measured values with dates and times at which sensors are found to have operated normally are used as measured values stored in the normal measured value storage 3. The diagnosis measured value storage 8 inputs the stored measured values to the sensor diagnoser 9.

The sensor diagnoser 9 obtains from an assignment result storage 7 a diagnostic model where sensors are assigned, obtains the diagnosis measured values from the diagnosis measured value storage 8, and diagnoses abnormalities in the sensors based on the obtained diagnostic model and measured values. Specifically, the sensor diagnoser 9 calculates an evaluation value by substituting the measured values of the sensors assigned to the arguments into the model formula. Then, the sensor diagnoser 9 compares the calculated evaluation value with a threshold value which is predetermined to diagnose whether there are abnormalities, and thereby diagnoses abnormalities in the sensors. The functional configuration of the sensor diagnoser 9 is implemented by a CPU 101 executing a control program. The sensor diagnoser 9 inputs a diagnostic result to the diagnostic result outputter 10.

The diagnostic result outputter 10 is an output terminal that outputs the diagnostic result obtained by the sensor diagnoser 9. The diagnostic result outputter 10 is configured by, for example, a display device 103. The diagnostic result outputter 10 may output not only the diagnostic result but also the evaluation value calculated by the sensor diagnoser 9 or may display the diagnostic result and the evaluation value in association with an instrumentation diagram.

Next, a sensor diagnostic process performed by the sensor diagnostic apparatus according to the present embodiment will be described with reference to FIG. 11. FIG. 11 is a flowchart showing the operation of the sensor diagnostic apparatus according to the present embodiment. In the sensor diagnostic apparatus, first, one abnormal sensor serving as a diagnostic target is specified. The sensor serving as a diagnostic target may be inputted by an operator of the sensor diagnostic apparatus or may be specified in advance by a control program.

When the sensor serving as a diagnostic target is specified, a diagnostic process starts. The sensor diagnoser 9 first obtains a diagnostic model for the specified sensor from the assignment result storage 7 and obtains the measured values of sensors assigned to the diagnostic model from the diagnosis measured value storage 8 (step S11).

Then, the sensor diagnoser 9 calculates an evaluation value by substituting the obtained measured values into the model formula (step S12), and compares the calculated evaluation value with a predetermined threshold value and thereby diagnoses abnormalities in the sensors (step S13). For the threshold value used here, an evaluation value calculated by the sensor assignment apparatus or a value calculated based on the evaluation value can be used. Then, a diagnostic result obtained by the sensor diagnoser 9 is outputted from the diagnostic result outputter 10 (step S14).

As described above, the sensor diagnostic apparatus according to the present embodiment can diagnose abnormalities in sensors based on a combination of sensors and a diagnostic model selected by the sensor assignment apparatus.

Note that the diagnosis measured value storage 8, the sensor diagnoser 9, and the diagnostic result outputter 10 may be configured by a different computer apparatus than the sensor assignment apparatus and configured as a sensor diagnostic system in which diagnostic models stored in the assignment result storage 7 of the sensor assignment apparatus are inputted to the sensor diagnoser 9 by a communication line.

Third Embodiment

Figure 12:
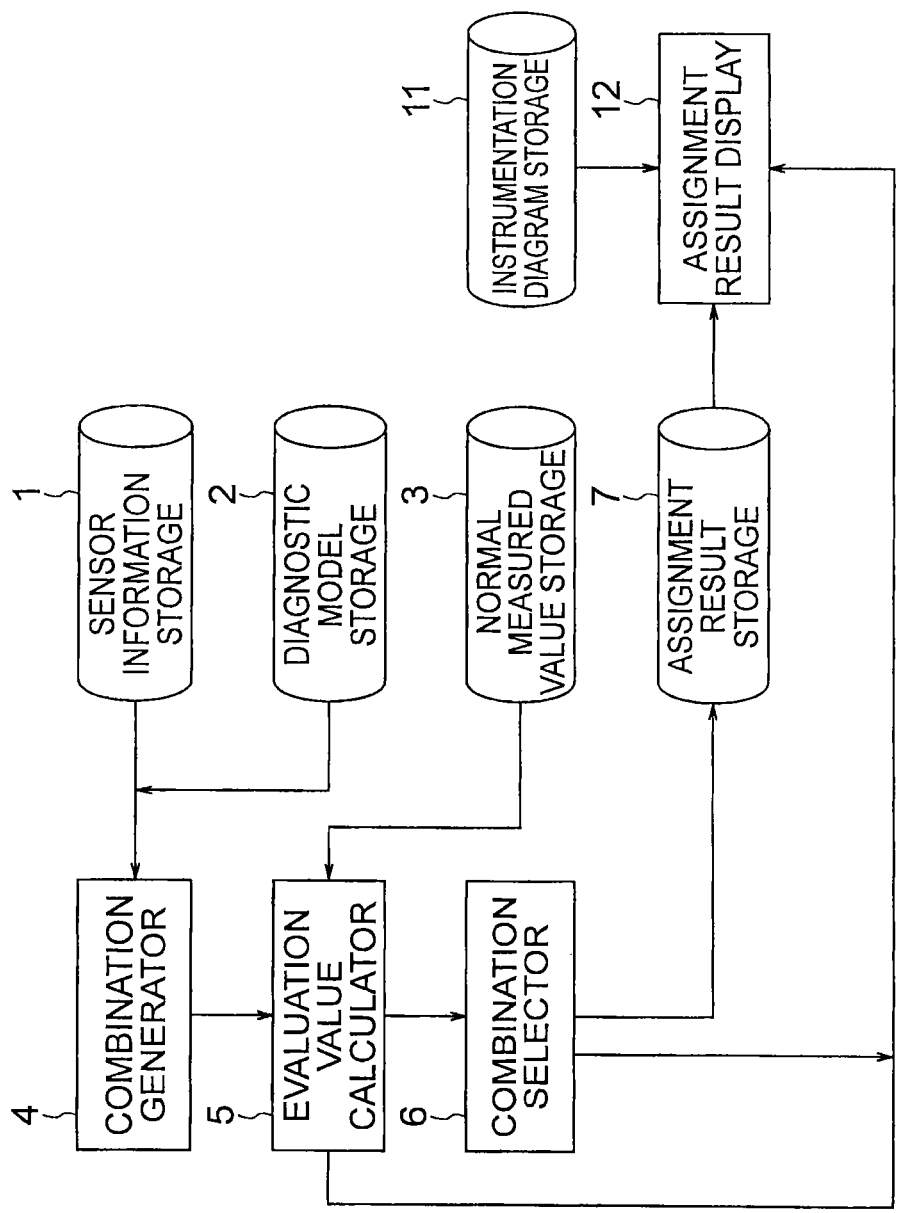
FIG. 12 is a block diagram showing a functional configuration of a sensor assignment apparatus according to a third embodiment.

Next, a sensor assignment apparatus according to a third embodiment will be described with reference to FIGS. 12 to 15. FIG. 12 is a block diagram showing a functional configuration of a sensor assignment apparatus according to the present embodiment. The sensor assignment apparatus of FIG. 12 includes a sensor assignment apparatus according to the first embodiment, an instrumentation diagram storage 11, and an assignment result display 12.

The instrumentation diagram storage 11 stores an instrumentation diagram of equipment to which the sensor assignment apparatus is applied. The instrumentation diagram storage 11 stores, for example, a diagram showing a positional relationship and a connection relationship between nodes, directed edges, and sensors, such as that shown in FIG. 2. The instrumentation diagram storage 11 is configured by a main storage device 105 or an external storage device 106.

The assignment result display 12 is a display terminal that displays combinations generated by a combination generator 4 and evaluation values of the combinations calculated by an evaluation value calculator 5. Specifically, the assignment result display 12 displays assignment results in table format such as that shown in FIG. 7. In addition, the assignment result display 12 can also obtain an instrumentation diagram from the instrumentation diagram storage 11 and output assignment results on the obtained instrumentation diagram in an associated manner. The assignment result display 12 may display arbitrary combinations whose evaluation values are calculated by the evaluation value calculator 5 and the evaluation values or may display a combination selected by a combination selector 6 and an evaluation value.

Figure 13:
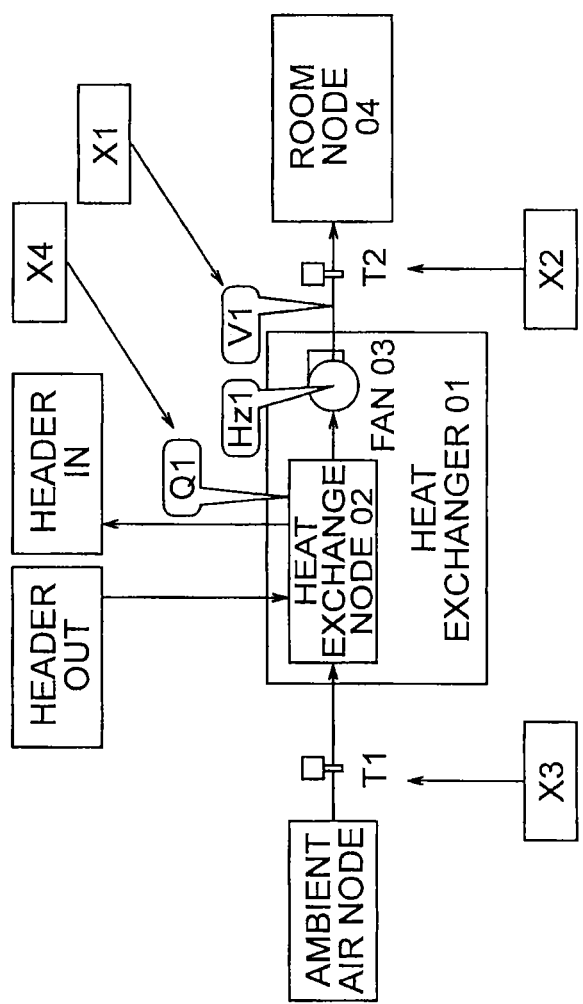
FIG. 13 is a diagram showing an example of a display screen of an assignment result display.

FIG. 13 is a diagram showing an example of a display format used by the assignment result display 12. In FIG. 13, the assignment results of FIG. 7 are displayed on the instrumentation diagram of FIG. 2. In addition, together with this instrumentation diagram, an evaluation value of a diagnostic model for the assignment results, the attribute information of each sensor, etc., may be displayed. The assignment result display 12 is configured by a display device 103.

Note that a sensor assignment process performed by the sensor assignment apparatus according to the present embodiment is the same as that of the first embodiment. In the present embodiment, after a sensor assignment process ends, assignment results are displayed on the assignment result display 12 automatically or in response to a request from an operator of the sensor assignment apparatus.

As described above, in the sensor assignment apparatus according to the present embodiment, assignment results are displayed on the assignment result display 12. Therefore, the operator of the sensor assignment apparatus can visually check sensor assignment results and thus can easily recognize the content and appropriateness of the assignment results. This is important when assignment results cannot be uniquely determined due to ambiguity in sensor information.

FIGS. 14A and 14B are diagrams showing examples of sensor information and an instrumentation diagram for when sensor information is ambiguous. Despite the fact that the instrumentation diagram of FIG. 14B shows two exhaust nodes, the sensor information of FIG. 14A only describes that the location attribute of a sensor T3 is from a branch node to an exhaust node. Hence, as shown in FIG. 14B, the location of the sensor T3 is assumed in two ways and thus cannot be identified. Such ambiguous sensor information may be generated when, for example, equipment is placed by a plurality of instrumentation companies that do not have a unified notation for IDs, etc.

In such a case, the combination generator 4 assumes both of a sensor T3_1 provided on a directed edge connected to an upper exhaust node of FIG. 14B and a sensor T3_2 provided on a directed edge connected to a lower exhaust node of FIG. 14B, and generates combinations for each sensor. Namely, when the attribute information of the sensor T3 cannot be uniquely identified, the combination generator 4 generates combinations for each attribute information which is possible attribute information of the sensor T3. Then, the evaluation value calculator 5 calculates evaluation values for each of the generated combinations.

Figures 15A, 15B:
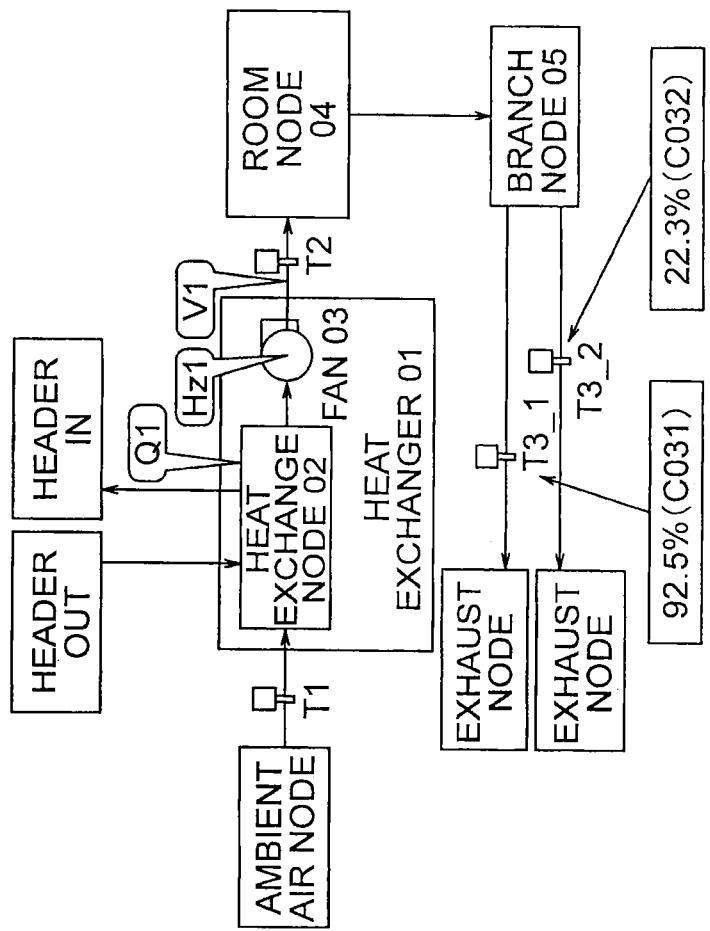
FIGS. 15A and 15B are diagrams showing an example of a display screen of the assignment result display for when the location attribute is ambiguous.

FIGS. 15A and 15B are diagrams showing a combination generated for the sensor T3_1 and a combination generated for the sensor T3_2. A combination C031 and a combination C032 of FIG. 15A have the same elements except for sensors (sensors T3_1 and T3_2) assigned to an argument X4.

As shown in FIGS. 15A and 15B, by displaying, on the assignment result display 12, the evaluation values of the combinations having the same elements except for the sensors assigned based on the ambiguous location attribute, such that the evaluation values can be compared with each other, the operator of the sensor assignment apparatus can easily recognize the accurate location of the sensor having an ambiguous location attribute. The operator may modify sensor information based on the sensor's accurate location attribute.

In addition, the sensor assignment apparatus may generate a group of combinations including the sensor T3_1 and a group of combinations including the sensor T3_2 by the above-described method, calculate average values of evaluation values of the respective groups, select the location attribute of the group with a higher average value as the location attribute of the sensor T3, and modify sensor information based on the selected location attribute. In the case of such a configuration, the sensor assignment apparatus can assign appropriate sensors to a diagnostic model based on the modified sensor information.

As such, even when sensor information is ambiguous, the sensor assignment apparatus according to the present embodiment can implement sensor assignment suitable for sensor diagnosis. In addition, ambiguous sensor information can also be automatically modified to correct sensor information. Furthermore, by displaying assignment results on the assignment result display 12, the operator is allowed to easily understand the assignment results and modify ambiguous sensor information.

Note that even when a measurement attribute or a type attribute is ambiguous, the sensor assignment apparatus can perform the same process as that described above. For example, when a type attribute is ambiguous, combinations are generated for both of the case in which the type attribute of the sensor is "measured" and the case in which the type attribute is "control". The same also applies to a measurement attribute.

In addition, a sensor diagnostic apparatus including the sensor assignment apparatus according to the present embodiment can also be configured. In this case, by sharing one unit by the assignment result display 12 and the diagnostic result outputter 10, the configuration of the sensor diagnostic apparatus can be simplified.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A diagnosis apparatus for a plurality of sensors arranged in a facility, the diagnosis apparatus comprising:
hardware storage configured to store sensor information including identifiers of the plurality of sensors, first measured values of the plurality of sensors at operating in a normal state a plurality of times, and a diagnostic function including a plurality of arguments; and
circuitry configured to:
read the sensor information, the first measured values of the plurality of sensors and the diagnostic function from the hardware storage;
generate candidates of a combination of sensors assigned to the arguments of the diagnostic function, based on the sensor information;
generate a plurality of mapping data from the arguments to the combination of sensors based on the candidates, and store the plurality of mapping data in the hardware storage;
assign the first measured values of the combination of sensors associated with each mapping data to the arguments mapped by each mapping data, calculate a first output value of the diagnostic function for each mapping data, and calculate an evaluation value based on the first output value for each mapping data;
select one mapping data the plurality of mapping data based on the evaluation value of each mapping data;
read second measured values of the combination of sensors associated with the selected mapping data from the hardware storage wherein the hardware storage is configured to store second measured values of the plurality of sensors therein;
assign the read second measured values to the arguments mapped by the selected mapping data and calculate a second output value of the diagnostic function; and
diagnose abnormality of the combination of sensors associated with the selected mapping data based on the second output value of the diagnostic function.

2. The diagnosis apparatus according to claim 1, wherein the circuitry is further configured to calculate a correlation coefficient of first output values as the evaluation value of the selected mapping data.

3. The diagnosis apparatus according to claim 1, wherein the circuitry is further configured to generate the candidates by comparing attribute information of each sensor with that of each argument.

4. The diagnosis apparatus according to claim 3, wherein when the attribute information of each sensor matches that of each argument, the circuitry is further configured to assign each sensor to each argument of the diagnostic function to generate the plurality of mapping data.

5. The diagnosis apparatus according to claim 3, wherein the attribute information for each sensor includes a measurement attribute or a location attribute, which indicates a unit of measured values or a location where the each sensor is placed, respectively.

6. The diagnosis apparatus according to claim 3, wherein there are a plurality of candidates of the attribute information of sensors, the circuitry is further configured to generate the candidates of a combination for each candidate of the attribute information.

7. The diagnosis apparatus according to claim 1, further comprising a display to display the plurality of mapping data and the evaluation values on a screen.

8. The diagnosis apparatus according to claim 7, wherein the display displays the plurality of mapping data and the evaluation values in association with an instrumentation diagram on a screen.

9. A sensor diagnostic apparatus comprising the diagnosis apparatus according to claim 1.

10. A sensor diagnosis method for a plurality of sensors arranged in a facility, the method comprising:
storing, into a hardware storage,
sensor information including identifiers of the plurality of sensors,
first measured values of the plurality of sensors operating in a normal state at a plurality of times, and
a diagnostic function including a plurality of arguments;
reading the sensor information, the first measured values of the plurality of sensors and the diagnostic function from the hardware storage;
generating candidates of a combination of sensors assigned to the arguments of the diagnostic function, based on the sensor information;
assigning the first measured values of the combination of sensors associated with each mapping data to the arguments mapped by each mapping data, calculate a first output value of the diagnostic function for each mapping data and calculating an evaluation value based on the first output value for each mapping data;
generating a plurality of mapping data from the arguments to the combination of sensors based on candidates, and storing the plurality of mapping data in the hardware storage;
selecting one of mapping data from the plurality of mapping data based on the evaluation value of each mapping data;
reading second measured values of the combination of sensors associated with the selected mapping data from the hardware storage wherein the hardware storage is further configured to store second measured values of the plurality of sensors therein;
assigning the second measured values to the arguments mapped by the selected mapping data and calculating a second output value of the diagnostic function; and
diagnosing abnormality of the combination of sensors associated with the selected mapping data based on the second output value of the diagnostic function.

11. A non-transitory computer readable medium having a computer program stored therein which causes a computer for a plurality of sensors arranged in a facility when executed by the computer, to perform processes comprising:
storing, into a hardware storage of the computer,
sensor information including identifiers of the plurality of sensors,
first measured values of the plurality of sensors operating in a normal state at a plurality of times, and
a diagnostic function including a plurality of arguments;

reading the sensor information, the first measured values of the plurality of sensors and the diagnostic function from the hardware storage;

generating candidates of a combination of sensors assigned to the arguments of the diagnostic function, based on the sensor information;

generating a plurality of mapping data from the arguments to the combination of sensors based on the candidates, and storing the plurality of mapping data in the hardware storage;

assigning the first measured values of the combination of sensors associated with each mapping data to the arguments mapped by each mapping data, calculating a first output value of the diagnostic function for each mapping data and calculating an evaluation value based on the first output value for each mapping data;

selecting one mapping data from the plurality of mapping data based on the evaluation value of each mapping data;

reading second measured values of the combination of sensors associated with the selected mapping data from the hardware storage wherein the hardware storage is further configured to store second measured values of the plurality of sensors therein;

assigning the read second measured values to the arguments mapped by the selected mapping data and calculating a second output value of the diagnostic function; and diagnosing abnormality of the combination of sensors associated with the selected mapping data based on the second output value of the diagnostic function.

12. The diagnosis apparatus according to claim 1, wherein the diagnostic function defines to perform arithmetic operations among the arguments.

13. The diagnosis apparatus according to claim 1, wherein the circuitry is further configured to diagnose the abnormality based on whether a second evaluation value based on the second output value is larger than a threshold.

14. A diagnosis apparatus for a plurality of sensors arranged in a facility, the diagnosis apparatus comprising:

hardware storage configured to store sensor information including identifiers of the plurality of sensors, first measured values of the plurality of sensors at a plurality of times, and a diagnostic function including a plurality of arguments; and circuitry configured to:

read the sensor information, the first measured values of the plurality of sensors and the diagnostic function from the hardware storage;

generate candidates of a combination of sensors assigned to the arguments of the diagnostic function by comparing attribute information of each sensor with that of each argument;

generate a plurality of mapping data from the arguments to the combination of sensors based on the candidates, and store the plurality of mapping data in the hardware storage;

assign the first measured values of the combination of sensors associated with each mapping data to the arguments mapped by each mapping data, calculate a first output value of the diagnostic function for each mapping data, and calculate an evaluation value based on the first output value for each mapping data;

select one mapping data from the plurality of mapping data based on the evaluation value of each mapping data;

read second measured values of the combination of sensors associated with the selected mapping data from the hardware storage wherein the hardware store is configured to store second measured values of the plurality of sensors therein;

assign the read second measured values to the arguments mapped by the selected mapping data and calculate a second output value of the diagnostic function; and diagnose abnormality of the combination of sensors associated with the selected mapping data based on the second output value of the diagnostic function.

15. A diagnosis apparatus for a plurality of sensors arranged in a facility, the diagnosis apparatus comprising:

hardware storage configured to store sensor information including identifiers of the plurality of sensors, first measured values of the plurality of sensors at a plurality of times, and a diagnostic function including a plurality of arguments; and circuitry configured to:

read the sensor information, the first measured values of the plurality of sensors and the diagnostic function from the hardware storage;

generate candidates of a combination of sensors assigned to the arguments of the diagnostic function, based on the sensor information;

generate a plurality of mapping data from the arguments to the combination of sensors based on the candidates, and store the plurality of mapping data in the hardware storage;

assign the first measured values of the combination of sensors associated with each mapping data to the arguments mapped by each mapping data, calculate a first output value of the diagnostic function for each mapping data, and calculate an evaluation value based on the first output value for each mapping data;

select one mapping data from the plurality of mapping data based on the evaluation value of each mapping data;

read second measured values of the combination of sensors associated with the selected mapping data from the hardware storage wherein the hardware store is configured to store second measured values of the plurality of sensors therein;

assign the read second measured values to the arguments mapped by the selected mapping data and calculate a second output value of the diagnostic function; and diagnose abnormality of the combination of sensors associated with the selected mapping data based on whether a second evaluation value based on the second output value of the diagnostic function is larger than a threshold.

* * * * *